United States Patent
Niu et al.

(10) Patent No.: US 11,948,277 B2
(45) Date of Patent: Apr. 2, 2024

(54) IMAGE DENOISING METHOD AND DEVICE, APPARATUS, AND STORAGE MEDIUM

(71) Applicant: ZTE CORPORATION, Guangdong (CN)

(72) Inventors: Chenxiao Niu, Guangdong (CN); Changming Yi, Guangdong (CN); Jing Li, Guangdong (CN); Wanquan Jiang, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 494 days.

(21) Appl. No.: 17/276,961

(22) PCT Filed: Jul. 23, 2019

(86) PCT No.: PCT/CN2019/097354
§ 371 (c)(1),
(2) Date: Mar. 17, 2021

(87) PCT Pub. No.: WO2020/057248
PCT Pub. Date: Mar. 26, 2020

(65) Prior Publication Data
US 2022/0036514 A1 Feb. 3, 2022

(30) Foreign Application Priority Data
Sep. 21, 2018 (CN) .......................... 201811110728.4

(51) Int. Cl.
*G06T 5/00* (2006.01)
*G06T 7/13* (2017.01)

(52) U.S. Cl.
CPC .............. *G06T 5/002* (2013.01); *G06T 5/003* (2013.01); *G06T 7/13* (2017.01); *G06T 2207/10024* (2013.01); *G06T 2207/10028* (2013.01)

(58) Field of Classification Search
CPC ........... G06T 5/002; G06T 5/003; G06T 7/13; G06T 2207/10024; G06T 2207/10028;
(Continued)

(56) References Cited

U.S. PATENT DOCUMENTS 5,031,227 A * 7/1991 Raasch .................... G06T 5/002
382/199
2007/0177817 A1* 8/2007 Szeliski .................. G06T 5/002
382/162
(Continued)

FOREIGN PATENT DOCUMENTS

| CN | 105719254 A | 6/2016 |
| CN | 106408524 A | 2/2017 |

(Continued)

OTHER PUBLICATIONS

Gu, S., Timofte, R. (2019). A Brief Review of Image Denoising Algorithms and Beyond. In: Escalera, S., Ayache, S., Wan, J., Madadi, M., Güçlü, U., Baró, X. (eds) Inpainting and Denoising Challenges. The Springer Series on Challenges in Machine Learning. Springer, Cham. (Year: 2019).*
(Continued)

*Primary Examiner* — Charles T Shedrick
(74) *Attorney, Agent, or Firm* — Li & Cai Intellectual Property (USA) Office (57) ABSTRACT

The present disclosure provides an image denoising method, an image denoising device, an image denoising apparatus and a storage medium. The method includes: performing edge detection on a color image to obtain a preprocessed
(Continued)

image; acquiring a depth image having the same scene as the color image; and performing a first noise reduction process on the preprocessed image according to the depth image to obtain a first image.

9 Claims, 8 Drawing Sheets

(58) Field of Classification Search
CPC .. G06T 5/50; G06T 7/194; G06T 2207/20081
See application file for complete search history.

(56) References Cited

U.S. PATENT DOCUMENTS

| | | | |
|---|---|---|---|
| 2014/0160239 A1* | 6/2014 | Tian | H04N 19/82 |
| | | | 348/43 |
| 2017/0244870 A1* | 8/2017 | Okuyama | H04N 1/6027 |
| 2020/0090322 A1* | 3/2020 | Seo | G06N 3/084 |
| 2020/0118248 A1* | 4/2020 | Deng | G06T 5/50 |
| 2023/0074482 A1* | 3/2023 | Ortiz Egea | G06T 5/002 |
| 2023/0081137 A1* | 3/2023 | Ortiz Egea | G06T 7/11 |
| | | | 382/173 |
| 2023/0134806 A1* | 5/2023 | Mallaiyan Sathiaseelan | |
| | | | G06N 3/08 |
| | | | 382/275 |

FOREIGN PATENT DOCUMENTS

| | | |
|---|---|---|
| CN | 107292826 A | 10/2017 |
| CN | 108399610 A | 8/2018 |
| WO | WO2018000427 A1 | 1/2018 |

OTHER PUBLICATIONS

W. Zuo, L. Zhang, C. Song, and D. Zhang. Texture enhanced image denoising via gradient histogram preservation. In Proceedings of the IEEE Conference on Computer Vision and Pattern Recognition, pp. 1203-1210, 2013. (Year: 2013).*
K. Zhang, W. Zuo, Y. Chen, D. Meng, and L. Zhang. Beyond a gaussian denoiser: Residual learning of deep cnn for image denoising. IEEE Transactions on Image Processing, 2017. (Year: 2017).*
European Patent Office, Extended European search report dated Apr. 22, 2022 corresponding to EP Application No. 19862828.1.
WIPO, International Search Report dated Sep. 11, 2019.
Zou, Xingxing, et al. "Kinect Depth Image Denoising Based on Edge Detection," Journal of Hunan University of Technology, vol. 27, No. 6, Nov. 2013.

* cited by examiner

IMAGE DENOISING METHOD AND DEVICE, APPARATUS, AND STORAGE MEDIUM

CROSS-REFERENCE TO RELATED APPLICATION

The present disclosure claims the priority of Chinese Patent Application No. 201811110728.4 entitled "Image Denoising Method and Device, Apparatus, and Storage Medium" and filed with the China National Intellectual Property Administration (CNIPA) on Sep. 21, 2018, the entire contents of which are incorporated herein by reference.

TECHNICAL FIELD

Embodiments of the present disclosure relate to the field of image processing, and relate to, but are not limited to, an image denoising method, an image denoising device, an image denoising apparatus, and a storage medium.

BACKGROUND

With the continuous development of digital multimedia technology, people have more and more requirements for high-definition and high-resolution of images. However, since the images are often affected by noise interference from imaging devices and external environments when being digitized and transmitted, the clarity of the images is reduced. A process of reducing the noise in an image is called Image Denoising. The common denoising method achieves partition denoising mainly by using various filters to filter signals, but such denoising method cannot avoid blurring of a boundary of an object occurring during the denoising process. In the related art, the clarity of details or outlines can be guaranteed by adopting a multi-frame noise reduction technique, but such technique requires continuous capture of a plurality of pictures for processing after a shutter is pressed, the shutter is locked during the capture process, and a long processing time is needed, which affects the effects of continuous shooting.

SUMMARY

In view of the above, the embodiments of the present disclosure provide an image denoising method, an image denoising device, an image denoising apparatus and a storage medium, so as to solve at least one of the technical problems in the related art.

An embodiment of the present disclosure provides an image denoising method, including:

performing edge detection on a color image to obtain a preprocessed image;

acquiring a depth image having the same scene as the color image; and performing a first noise reduction process on the preprocessed image according to the depth image to obtain a first image.

An embodiment of the present disclosure further provides an image denoising device, including:

a detection unit configured to perform edge detection on a color image to obtain a preprocessed image;

an acquisition unit configured to acquire a depth image having the same scene as the color image; and a first noise reduction unit configured to perform a first noise reduction process on the preprocessed image according to the depth image to obtain a first image.

An embodiment of the present disclosure further provides an image denoising apparatus, including a memory and a processor, a computer program capable of running on the processor is stored on the memory, and the above image denoising method is implemented when the processor executes the computer program.

An embodiment of the present disclosure further provides a computer-readable storage medium having computer-executable instructions stored thereon, and the computer-executable instructions are configured to perform the above image denoising method.

DETAILED DESCRIPTION

For facilitating better understanding of the embodiments of the present disclosure, the terms are explained below.

Image noise is a random variation of brightness or color information in an image (an object which is shot does not have such random variation), and is usually an expression of electronic noise. The image noise is typically produced by a sensor and a circuit of a scanner or digital camera, and may also be produced under the effect of film grain or unavoidable shot noise of an ideal photon detector. The image noise is an undesirable by-product of image shooting, and adds errors and additional information to the image.

Noise: a pixel with image noise.

Image denoising: when being digitalized and transmitted, digital images are often affected by noise interference from imaging devices and external environments in real life, and are referred to as noise-containing images or noisy images. A process of reducing noise in a digital image is referred to as image denoising.

Texture feature: texture is a visual feature that reflects the homogeneity in an image, and represents properties of organization and arrangement of a slowly or periodically changing surface structure of a surface of an object. The texture has three major characteristics: some local, sequential and continuous repetition, nonrandom arrangement, and roughly uniform entities in a textured region.

Foreground/Background of image: a foreground is a person or object that is nearer to a lens or in front of a subject; and a background is a person or object that is farther from the lens or behind the subject. The foreground and the background are basic layers of photography composition, and can make a picture rich in layer and depth.

Multi-frame noise reduction technique is that a camera collects multiple pictures or images or multiple frames of pictures or images in a period from pressing the shutter to the imaging process when shooting at night or in low light, different pixels with noise are found in the different frames, and a weighted synthesis process is performed to obtain a clear night photo or low light photo.

Edge image is an image obtained by performing edge extraction on an original image. The most basic characteristic of an image is edges in the image, the edges are the places where regional attributes suddenly change, and also the places which are most uncertain, and the place where the image information is most concentrated. The edges of the image contain abundant information.

Edge detection technique is to obtain an edge image by extracting pixels of edges from an image through calculation.

Depth map is an image or image channel that contains information relating to distances to surfaces of scene objects. The depth map is similar to a grayscale image except that the value of each pixel of the depth map represents an actual distance from a sensor to an object.

Connected region: if a simple closed curve is arbitrarily drawn in a region on a complex plane and an interior of the simple closed curve always belongs to the region, the region is a simply connected region.

Image sharpening is a process of making an image clearer by compensating for outlines in the image and enhancing edges and parts of gray level jump in the image, and is divided into methods in spatial domain and methods in frequency domain. The image sharpening is to highlight edges and contours of a ground object in an image, or features of some linear target elements. Such filtering methods enhance the contrast between the edges of the ground object and the surrounding pixels, and thus are also referred to as edge enhancement.

Dual camera: shooting with a dual camera. The dual camera can measure a distance, take pictures and produce a depth map through operation.

Grayscale value: grayscale represents an object by tones of black, that is, with black used as a reference color, an image is displayed with black of different saturations. Each grayscale object has a brightness value from 0% (white) to 100% (black).

In current image processing field, the images captured are generally subjected to a noise reduction process. However, the noise reduction effect is significantly reduced at night or in a low light environment. In general, the processing of noise can affect the display of details. The related art still cannot meet the requirement of ensuring the clarity of details when the noise is reduced in a low light environment. Specifically, the processing of boundaries between objects often blurs the boundaries while the noise is reduced.

In some related arts, a method of partition noise reduction is adopted for image denoising. The basic principle of the method is to draw concentric circles around a center of a picture that is used as the center of the circles, and set noise reduction coefficients for the pixels in such a way that the closer the pixel is to the center, the smaller the noise reduction coefficient is, the farther the pixel is from the center, the greater the noise reduction coefficient is. The noise reduction coefficient can be understood as a degree of noise reduction, and the smaller the noise reduction coefficient, the lower the degree of noise reduction. According to the imaging principle of a common camera, the image captured is bright in the center and dark in the periphery. In such case, the noise in a darker region may be higher than that in a brighter central region, and thus the above method of partition noise reduction can effectively denoise the whole image. However, this method still cannot avoid the blurring of boundaries between objects when the noise is reduced, that is, is poor in the processing effect of image edges.

In some other related arts, when a noise reduction process is performed on an image, a foreground of a captured image is separated from a background of the image based on texture features, the noise reduction process is performed on the foreground and the background respectively, and then a synthesis process is performed. This method requires training and distinguishing the texture features of the foreground and the background, and involves complex processing processes. Although clear boundaries between the foreground and the background can be preserved with this method, the contours of the objects in the foreground and the background are still blurred due to the noise reduction process.

In other related arts, the image denoising can also be implemented using the multi-frame noise reduction technique. By synthesizing image data of multiple frames, the multi-frame noise reduction technique can ensure the clarity of details and boundaries when the noise is reduced. Since a plurality of images are supposed to be continuously captured and to be processed in practical applications of the multi-frame noise reduction technique, the shutter is locked during the capture process and the processing takes a long time, which is not favorable for continuous dynamic shooting and affects shooting effects.

The present disclosure is illustrated below with reference to the embodiments.

Embodiment One

An embodiment of the present disclosure provides an image denoising method applied to image processing equipment. After the equipment perform noise reduction with the method, most of edge information can be preserved, and detail information can also be preserved, with no need to acquire multiple frames of images or lock the shutter, thereby improving user's experiences. The functions of the method may be implemented by a processor in the image processing equipment calling program codes, and the program codes can be stored in a computer storage medium. Therefore, the image processing equipment at least includes a processor and a storage medium.

Figure 1:
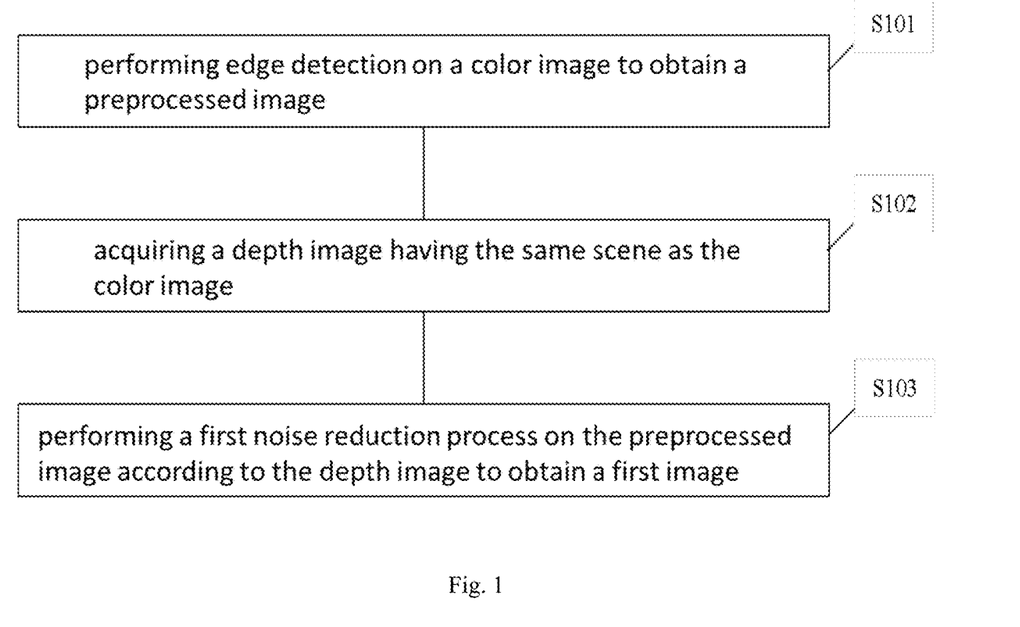
FIG. 1 is a flowchart illustrating an implementation of an image denoising method according to an embodiment of the present disclosure.

FIG. 1 is a flowchart illustrating an implementation of an image denoising method according to an embodiment of the present disclosure. As shown in FIG. 1, the method includes following steps S101 to S103.

S101, performing edge detection on a color image to obtain a preprocessed image.

The color image may be an image directly captured by photography equipment, an image requiring processing, a grayscale image only including grayscales, or a colored image. The edge detection is to extract pixels of the edges from the image through calculation to obtain an edge image. The preprocessed image is an edge image obtained after the edge detection. Since the edge detection is achieved by detecting pixels with high-frequency characteristics, the preprocessed image contains noises, which are distributed in a region near an edge, and are also distributed in a connected region other than the edge. The images acquired in low light situations may contain more noises.

S102, acquiring a depth image having the same scene as the color image.

The depth image having the same scene as the color image is acquired by a device capable of acquiring depth information, such as a device with a dual-camera function. The depth image contains depth information, and regions with connected depths which can be distinguished. In practical applications, the depth image and the color image can be collected by different devices or the same device, and can be collected separately or simultaneously; further, the color image may be a depth image containing depth information. No matter how the depth image and the color image are collected, it should be ensured that the color image and the depth image correspond to the exactly same scene.

Depth information can reflect a distance from an object in an image to a camera, and can be acquired by a range sensor of photography equipment such as a dual camera. A depth image corresponding to an original image can be generated according to the depth information of the image, and a value of each pixel in the depth image reflects the distance from an object in the scene to the camera. With the depth image, different objects and boundaries between each face and the other faces of an object can be better distinguished from one another.

S103, performing a first noise reduction process on the preprocessed image according to the depth image to obtain a first image.

By referring to both the preprocessed image obtained by edge extraction and the depth image, a depth connected region in the preprocessed image can be found according to the depth image, the high-frequency pixels in the depth connected region are noises; and a place in a region where the depth changes, which overlaps the preprocessed image, is an edge, and the first image having clear edges can be obtained by removing the high-frequency noises through the first noise reduction process.

In an implementation, the step of performing the first noise reduction process on the preprocessed image according to the depth image to obtain the first image includes:

performing the first noise reduction process on the preprocessed image according to the connected region of each connected depth in the depth image to obtain the first image.

The connected region of each connected depth, that is, a region enclosed with each edge, can be recognized with reference to the depth image. Scattered noises in each connected region can be removed by respectively performing the first noise reduction process on the connected regions, so as to ensure that most of the pixels with high-frequency information in the first image are boundary pixels.

In an implementation, the step of performing the first noise reduction process on the preprocessed image according to the connected region of each connected depth in the depth image to obtain the first image includes:

determining high-frequency noises in the connected region according to the connected region of each connected depth in the depth image; and performing the first noise reduction process to remove the high-frequency noises to obtain the first image.

The first noise reduction process is performed on the region of each connected depth to eliminate the isolated noises with high-frequency characteristics, so as to avoid blurring the edge as much as possible and facilitate improving the accuracy of subsequent noise reduction processes. The first noise reduction process may be implemented with various denoising methods. For example, a pixel near the high-frequency noise is selected, and a grayscale value of the high-frequency noise is changed to the grayscale value of the selected pixel adjacent thereto; or, all pixels in a region near the high-frequency noise are selected, an average of the grayscale values of the pixels is calculated, and the grayscale value of the high-frequency noise is changed to the average; or, an average of gray scale values of all pixels in a connected region is calculated, and the grayscale values of all high-frequency noises in the connected region are changed to the average.

In an implementation, the step of performing edge detection on the color image to obtain the preprocessed image includes following steps S11 and S12.

S11, sharpening the color image to obtain a sharpened image.

The color image is first sharpened with a terminal device, and the sharpening process can make edges more obvious, which facilities the subsequent edge detection of the image. The sharpening process can amplify both details and noise.

S12, performing edge detection on the sharpened image to obtain the preprocessed image.

The color image is subjected to the edge detection after being sharpened, that is, the edge detection is performed on the obtained sharpened image, so that the edges in the image can be detected more accurately, while the noise amplified by the sharpening process can be also detected, resulting in the preprocessed image with a large number of scattered noises. Those scattered noises need to be subjected to the noise reduction process in the step S103 according to the embodiment.

Embodiment Two

Figure 2:
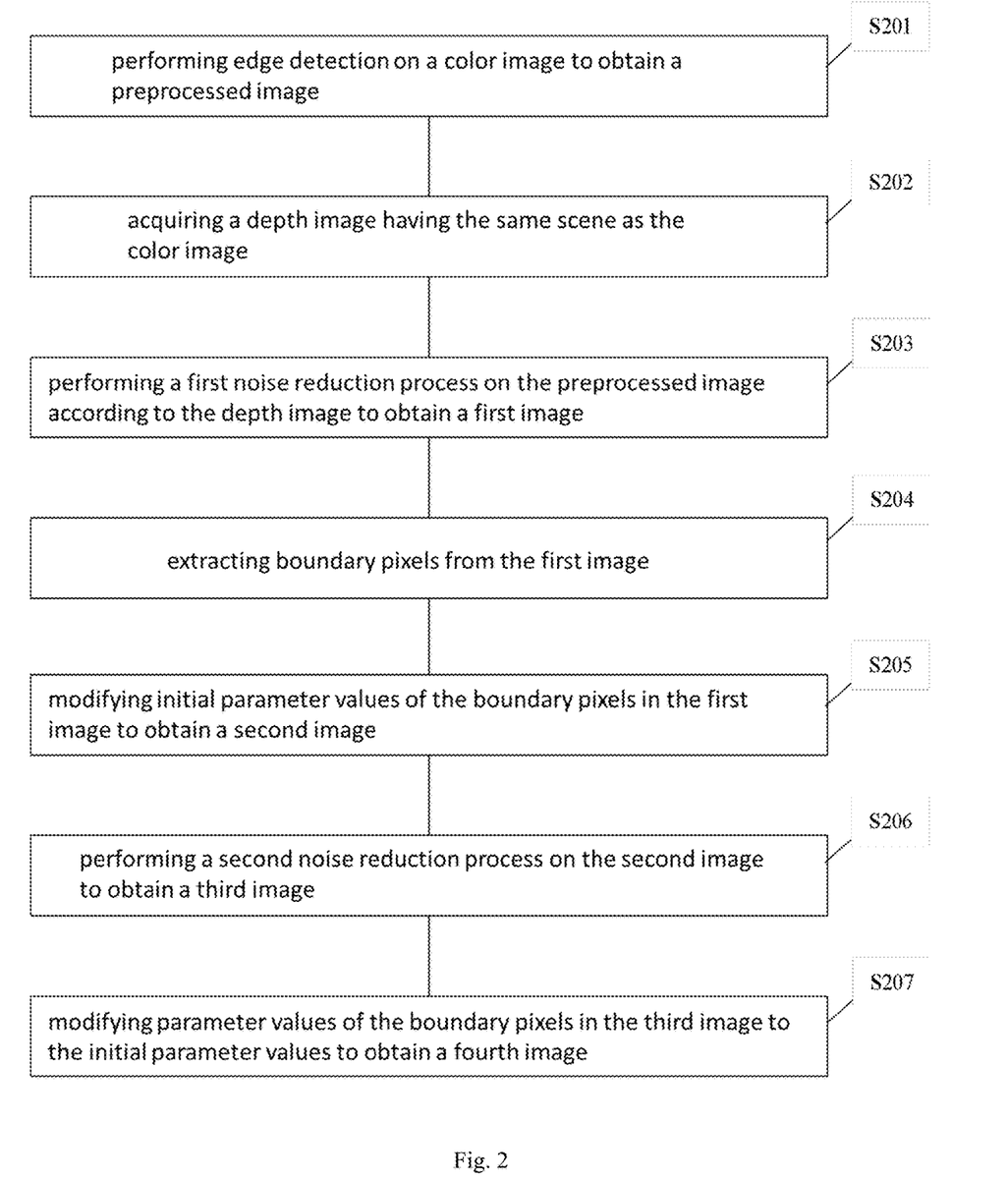
FIG. 2 is another flowchart illustrating an image denoising method according to an embodiment of the present disclosure.

An embodiment of the present disclosure further provides an image denoising method. As shown in FIG. 2, the method includes following steps S201 to S207.

S201, performing edge detection on a color image to obtain a preprocessed image.

S202, acquiring a depth image having the same scene as the color image.

S203, performing a first noise reduction process on the preprocessed image according to the depth image to obtain a first image.

The above steps S201 to S203 are the same as the steps S101 to S103 in the above embodiment, and thus are not repeatedly detailed herein.

S204, extracting boundary pixels from the first image.

The boundary pixels in the first image, serving as an input of the subsequent processing step, are extracted by a terminal device. The boundary pixels refer to pixels which constitute edges in the image, and include the pixels which constitute boundaries between objects and those which constitute edges of the objects. The boundary pixels corresponding to the edge image obtained in the step S201 can be directly extracted from the first image. Edges in different images may be represented in different forms. For example, in an image, the boundaries between objects are black and are represented in the form of black lines, while an edge of an object is white due to the irradiation of light; and it is also possible to recognize the edges according to changes of the colors of the objects. In practical applications, the edge can be recognized according to brightness values and gray scale values of pixels or an abrupt change of color, that is, according to the pixels with high-frequency characteristics.

The terminal device may be the photography equipment used to acquire an original image, such as a mobile phone, a digital camera, and a video camera, or may be related computer equipment for post-processing.

S205, modifying initial parameter values of the boundary pixels in the first image to obtain a second image.

The terminal device modifies the parameter values of the extracted boundary pixels for removing edges, that is, modifying the parameter values of the pixels of an edge, such as the brightness values or grayscale values of the boundary pixels, to the values of the pixels without high-frequency characteristics. The subsequent noise reduction process is typically performed on a region selected. For example, a region of n×n pixels (n is a natural number greater than 1) is selected, and the parameter values of the pixels within the region are averaged to achieve an effect of removing high-frequency pixels. Since the noise generally has the high-frequency characteristics similar to those of the boundary pixels of the edge, the high-frequency characteristics of the boundary pixels are also be removed while the high-frequency characteristics of the noise are removed during the noise reduction process. Thus, the edge is blurred while the noise is reduced.

The parameter values of the boundary pixels are first modified to remove the high-frequency characteristics of the boundary pixels, so that the parameter values of the boundary pixels cannot affect the pixels adjacent thereto when the image is denoised. Meanwhile, the original values of the boundary pixels are stored, and are not to be influenced by the noise reduction process. In this way, the boundary pixels of a pixel-level edge near an edge would not be blurred due to the noise reduction process.

S206, performing a second noise reduction process on the second image to obtain a third image.

The terminal device performs the noise reduction process on the second image, from which the edges have been removed in the step S205, to obtain the denoised third image. Since the edges are removed in the second image, the noise reduction process will not be affected by the high-frequency pixels of the edges and other details, so that a higher degree of noise reduction can be adopted in this step, for example, a higher noise reduction coefficient can be adopted. In this way, low noise in the image can be removed as well, so as to achieve a better noise reduction effect.

S207, modifying the parameter values of the boundary pixels in the third image to the initial parameter values to obtain a fourth image.

The image obtained after the noise reduction process in the step S206 is an image without edges and detail information, so the original edges and detail information in the image need to be restored after the noise reduction process. The terminal device calls the stored initial parameter values of the boundary pixels, and modifies the parameter values of the boundary pixels in the denoised image to the initial parameter values, so as to obtain the denoised fourth image having the edges and the detail information.

In an implementation, the step of modifying the initial parameter values of the boundary pixels in the first image to obtain the second image includes:

S21, determining a reference pixel for the boundary pixels;

S22, determining a parameter value of the reference pixel; and

S23, modifying the initial parameter values of the boundary pixels in the first image to the parameter value of the reference pixel to obtain the second image.

In the embodiment, the initial parameter values of the boundary pixels are modified based on the reference pixel. That is, the modification of the initial parameter values of the boundary pixels is to replace the initial parameter values of the boundary pixels with the parameter value of the selected reference pixel. The reference pixel is a pixel with no high-frequency characteristics relative to the other pixels in the image, and may be a pixel near a boundary pixel in the first image, or a preset pixel.

In an implementation, the step of determining the reference pixel for the boundary pixels includes determining a pixel which is within a preset distance range from the boundary pixels as the reference pixel; and the step of determining the parameter value of the reference pixel includes: in response to that multiple reference pixels are determined for the boundary pixels, determining that an average of brightness values of the reference pixels is the parameter value of the reference pixels.

Here, the pixel near the boundary pixels is used as the reference pixel, and one or more reference pixels may be determined. If the number of the pixels within the preset distance range is greater than 1, the average of the brightness values of the pixels can be used as the parameter value of the reference pixels, and the initial parameter values of the corresponding boundary pixels can be modified to the parameter value of the reference pixels.

The brightness value is used as the parameter value in the embodiment, while, in practical applications, various characteristic values of pixels in an image such as grayscale value and color value can also be used as the parameter value, and the parameter value may be determined according to the characteristics of an actual image. In an implementation, any one of the above methods may further include:

S24, performing a third noise reduction process on the boundary pixels to obtain a fifth image, with a degree of noise reduction of the third noise reduction process being lower than that of the second noise reduction process.

Since the boundary pixels of an edge are pixels with high-frequency characteristics, the edge will be blurred if the boundary pixels are denoised with a high degree of noise reduction. Therefore, a relative lower degree of noise reduction is adopted for the noise reduction process performed on the boundary pixels in this step. For example, the noise reduction coefficient in the third noise reduction process is adjusted to half of that in the second noise reduction process, so as to remove the noise from the boundary pixels.

Through the steps of the above method, the whole image can be denoised, with as much detail and edge information preserved as possible.

Embodiment Three

Figure 3A:
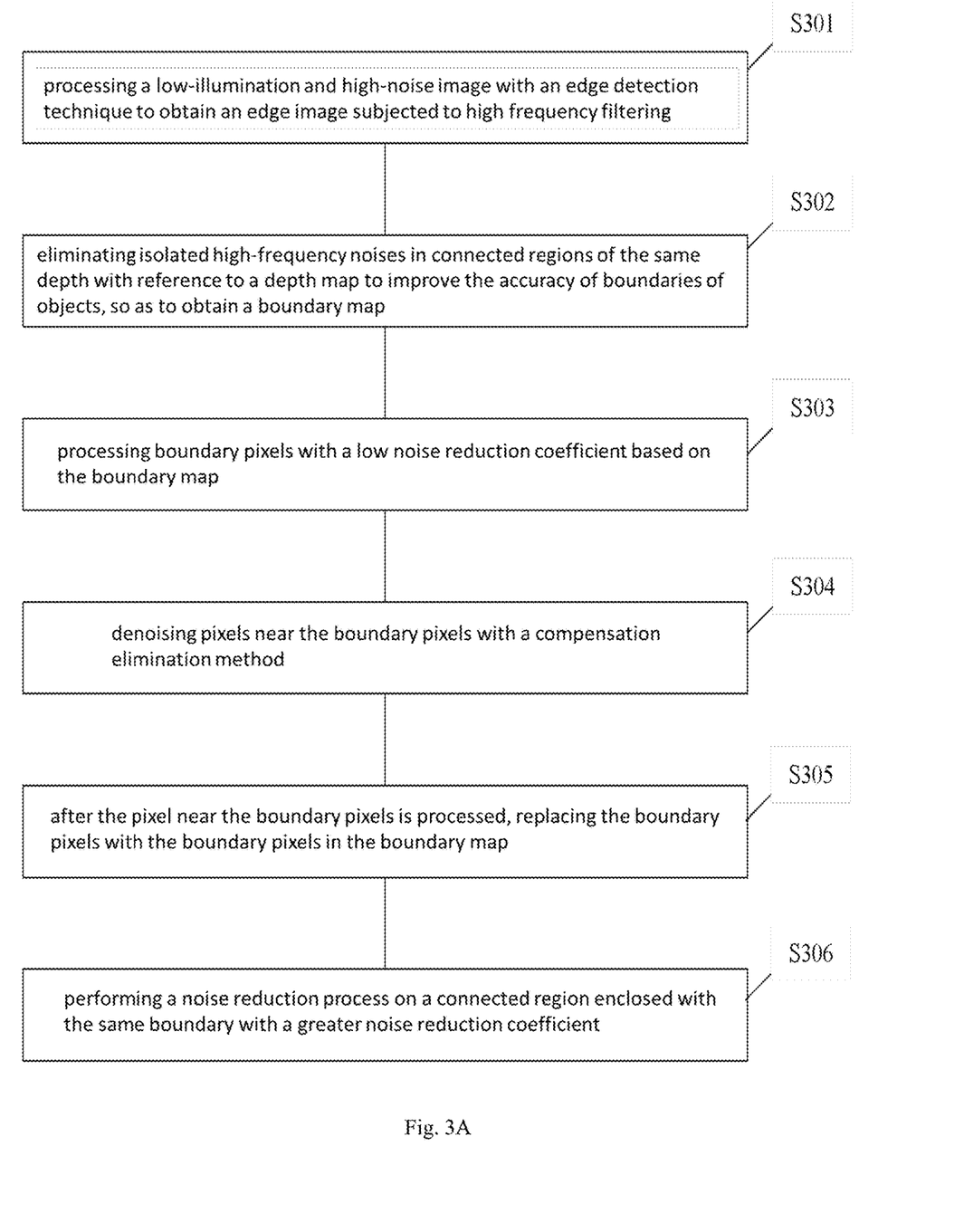
FIG. 3A is still another flowchart illustrating an image denoising method according to an embodiment of the present disclosure.

An embodiment of the present disclosure provides an image denoising method. As shown in FIG. 3A, the method includes following steps S301 to S306.

S301, processing a low-illumination and high-noise image with an edge detection technique to obtain an edge image subjected to high frequency filtering.

What is processed in this step is a low-illumination and high-noise image, that is, an image which is captured in a low light situation and has more noises. After the image is subjected to high-frequency filtering using the edge detection technique, the pixels whose grayscale values suddenly change in the image can be screened out to obtain the edge image. Since the noises are pixels whose grayscale values suddenly change, the edge image contains not only the pixels of edges but also the noises within connected regions.

S302, eliminating isolated high-frequency noises in connected regions of the same depth with reference to a depth map to improve the accuracy of boundaries of objects, so as to obtain a boundary map.

The depth of each connected region can be recognized according to the depth map, which enables separate processing of the noises in the connected regions of the same depth. The isolated high-frequency noises are discontinuous high-frequency noises, that is, the relatively obvious noises.

S303, processing boundary pixels with a low noise reduction coefficient based on the boundary map.

Only the boundary pixels in the boundary map are denoised with a low noise reduction coefficient in this step, that is, a relatively weak noise reduction process is performed, so as to eliminate the noise from the boundary pixels, make the boundaries clearer and preserve more details.

S304, denoising pixels near the boundary pixels with a compensation elimination method;

The compensation elimination method is to replace the boundary pixels with a pixel near the boundary pixels, that is, a to-be-denoised pixel near the boundary pixels. After the replacement is completed, the pixel near the boundary pixels is denoised. In this way, when the pixel near the boundary pixels is denoised, an influence caused by the boundary pixels is avoided, which avoids the blurring around the boundary pixels.

S305, after the pixel near the boundary pixels is processed, replacing the boundary pixels with the boundary pixels in the boundary map.

S306, performing a noise reduction process on a connected region enclosed with the same boundary with a greater noise reduction coefficient.

Since the interior of the connected region is not affected by the boundaries, a greater noise reduction coefficient can be selected, that is, a relatively strong noise reduction process can be performed, so as to also remove low-frequency noises, that is, weaker and unobvious noises, within the connected region, thereby ensuring a noise reduction effect.

Figure 3B:
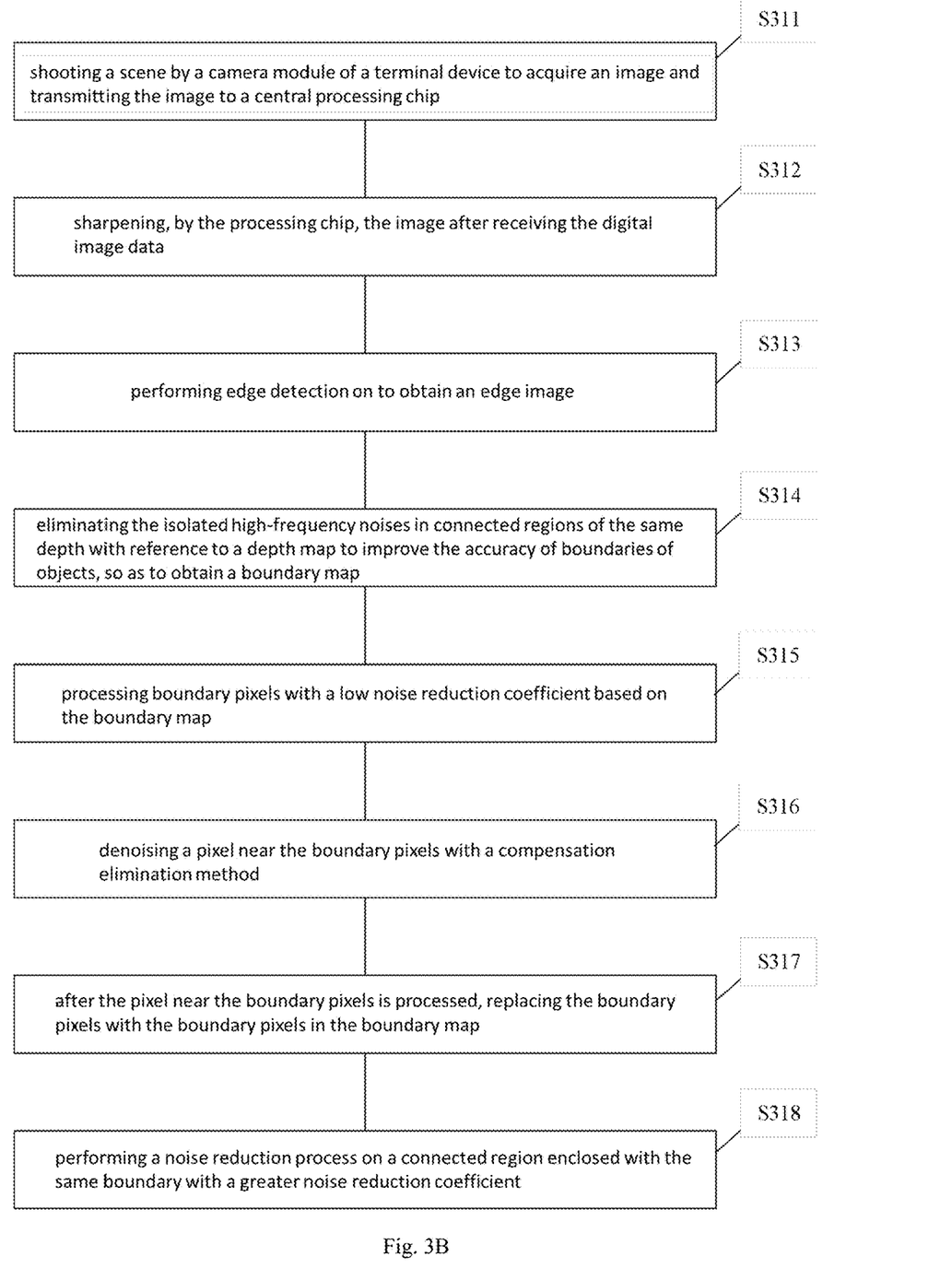
FIG. 3B is still another flowchart illustrating an image denoising method according to an embodiment of the present disclosure.

In an implementation, the image denoising method is as shown in FIG. 3B, and includes following steps S311 to S318.

S311, shooting a scene by a camera module of a terminal device to acquire an image and transmitting the image to a central processing chip.

The central processing chip may be a central processing unit (CPU) or a graphics processing unit (GPU).

S312, sharpening, by the processing chip, the image after receiving the digital image data.

Through the sharpening process, details can be highlighted and thus become clearer, and boundaries become more obvious, which facilities subsequent edge detection. The sharpening process can be implemented with filtering methods in the related art.

S313, performing edge detection on the sharpened image to obtain an edge image.

Figure 3C:
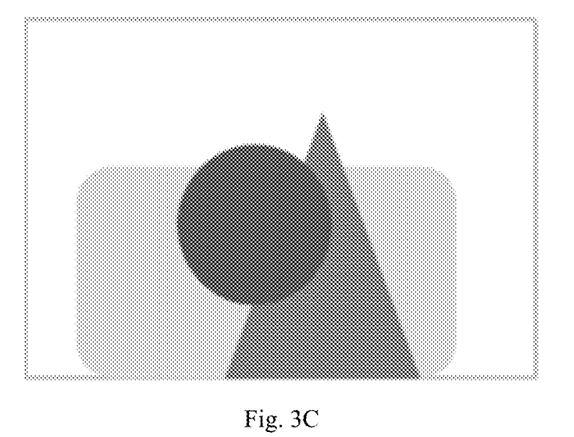
FIG. 3C shows an original image in an embodiment of the present disclosure.
Figure 3D:
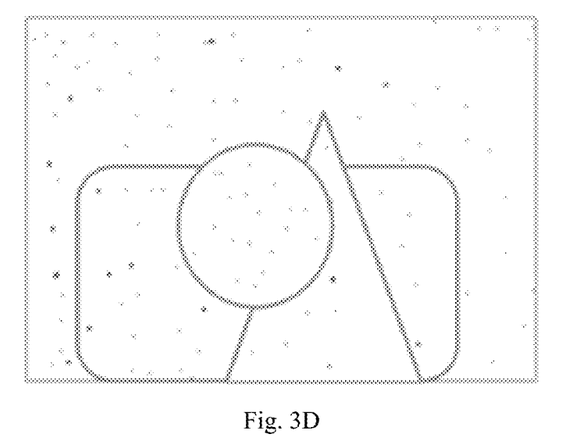
FIG. 3D shows an image obtained after sharpening in an embodiment of the present disclosure.

The sharpening process can also amplify the noise in the image, and the amplification of the noise is more obvious for the low-illumination image which is acquired in a low light situation. Assuming that three objects are placed together in an environment, FIG. 3C is an original image, and FIG. 3D is an image obtained after the original image is subjected to sharpening and then subjected to edge detection. Since high-frequency pixels are sharpened, the edge image contains a large number of scattered noises.

S314, eliminating the scattered noises in connected regions of the same depth with reference to a depth map to improve the accuracy of boundaries of objects, so as to obtain a boundary map.

Figure 3E:
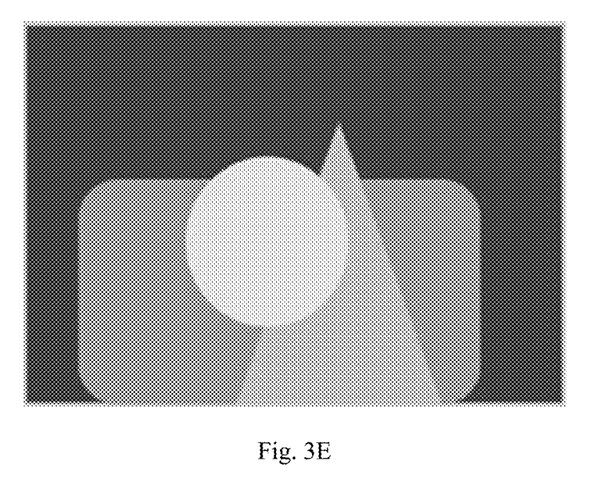
FIG. 3E is a depth map corresponding to an image in an embodiment of the present disclosure.
Figure 3F:
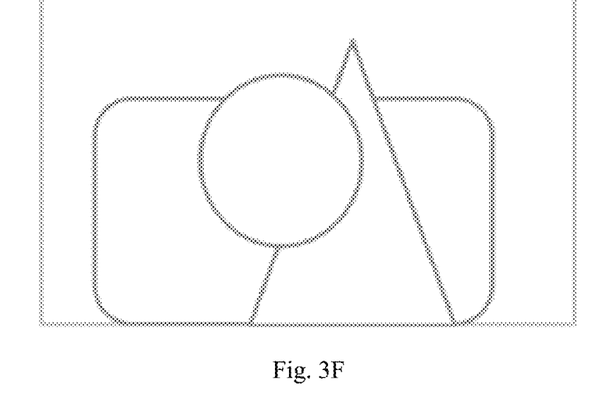
FIG. 3F shows an image obtained after edge detection in an embodiment of the present disclosure.

In order to solve the problem of the scattered noises, the depth map of the scene is acquired through a dual camera function, as shown in FIG. 3E, the isolated high-frequency pixels within the connected regions of the same depth are eliminated to obtain a final edge map as shown in FIG. 3F. The simple dual camera function can only distinguish a depth of field of a foreground from a depth of field of a background and thus cannot directly distinguish between two objects in the same depth, so the boundary between the two objects is influenced by the clarity during noise reduction. Therefore, the edge image is first obtained through the edge detection technique, and then the boundary map is obtained with reference to the depth map.

S315, processing boundary pixels with a low noise reduction coefficient based on the boundary map.

Figure 3G:
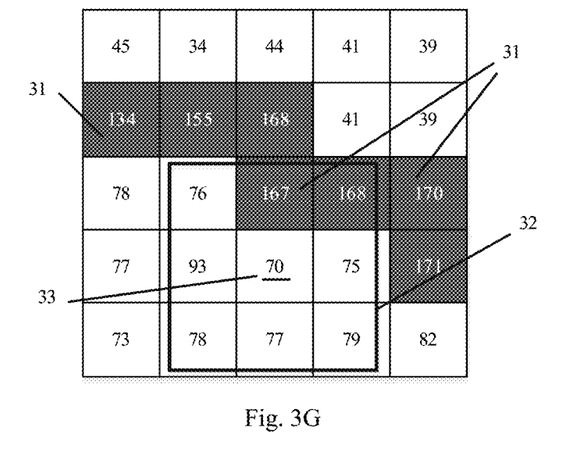
FIG. 3G is a schematic diagram illustrating a process of denoising an image according to an embodiment of the present disclosure.

After the boundary map is obtained, the whole image is denoised partition by partition. The image denoising of the image involves multiplication using a matrix template. As shown in FIG. 3G, each square represents a pixel, the number inside each square represents the brightness value or grayscale value of the pixel, black pixels 31 are continuous pixels of a segment of boundary between two objects that are on both sides of the black pixels, and the black pixels 31 have different brightness values or grayscale values.

Figure 3H:
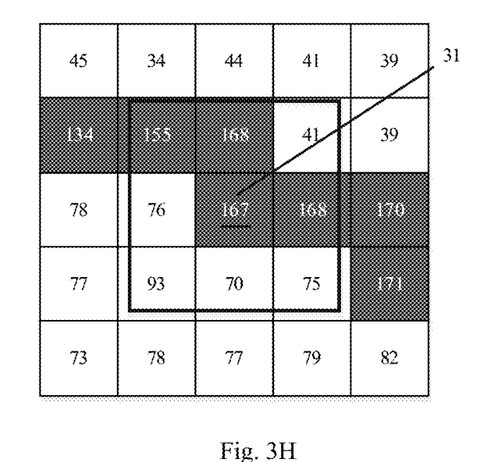
FIG. 3H is a schematic diagram illustrating a process of denoising a boundary pixel in an image according to an embodiment of the present disclosure.

In general, the processing is carried out based on a 3×3 matrix, for example, a pixel 33 in the center of a matrix 32 is processed, and the brightness value or grayscale value of the boundary may be introduced in the calculation to reduce the difference of the boundary, which causes the blurring of the boundary. In this embodiment, the boundary map composed of the boundary pixels is obtained in advance, and is denoised alone. For example, in the case as shown in FIG. 3H, the boundary pixel 31 is denoised with a noise reduction coefficient which is adjusted to half of a normal one.

S316, denoising a pixel near the boundary pixels with a compensation elimination method.

Figure 3I:
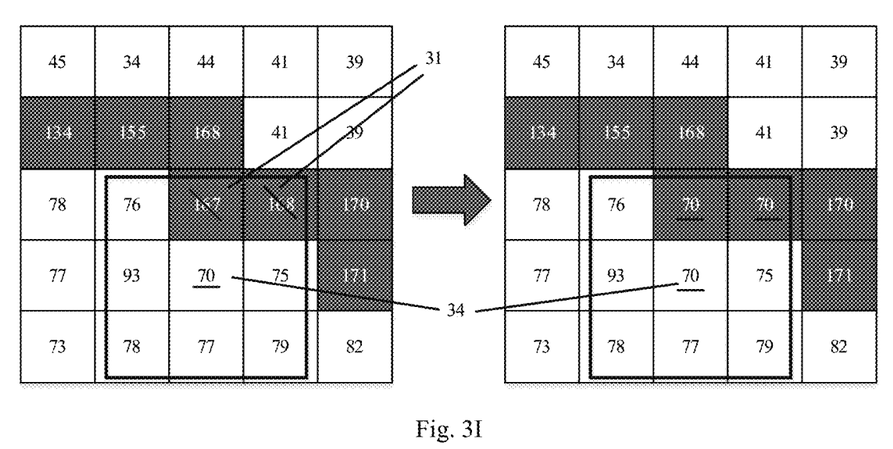
FIG. 3I is a schematic diagram illustrating a process of denoising a pixel near a boundary pixel in an image according to an embodiment of the present disclosure.

When a pixel 34 near the boundary pixels is to be denoised, the boundary pixels 31 are eliminated and replaced with the pixel 34, as shown in FIG. 3I. After the replacement, a noise reduction process is performed on the pixel 34 near the boundary pixels.

S317, after the pixel near the boundary pixels is processed, replacing the boundary pixels with the boundary pixels in the boundary map.

After the noise reduction process of the pixel 34 near the boundary pixels is completed, the boundary pixels 31 are replaced, with the values thereof restored. The entire boundary and the pixels near the boundary pixels are denoised through the above steps.

S318, performing a noise reduction process on a connected region enclosed with the same boundary with a greater noise reduction coefficient.

Since the interior of the connected region is not affected by the boundary, a greater noise reduction coefficient can be selected, that is, a relatively strong noise reduction process can be performed, so as to also remove low-frequency noises within the connected region, thereby ensuring a noise reduction effect.

In an implementation, when the edge detection is performed, not only the depth map but also texture features or color distribution is considered to recognize the edges and extract the boundary pixels.

According to this embodiment, in practical applications of the above method in a terminal, a prompt "intelligent noise reduction is going on" may be displayed in an interface of a shooting application of the terminal, and a switch control may be provided in an interface of a viewfinder to turn on or off the function of intelligent noise reduction.

By processing an image with the above method, most of the boundary information can be preserved, and the details can also be preserved, with no need to acquire multiple frames of images, thereby improving the processing efficiency. Furthermore, the method can also be used to improve image quality of pictures taken by common photography equipment.

Embodiment Four

Based on the above embodiments, an embodiment of the present disclosure provides an image denoising device including units and the modules included in each of the units. The device may be implemented by a processor in a terminal, or by a specific logic circuit. In the implementation of the device, the processor may be a CPU, a microprocessor unit (MPU), a digital signal processor (DSP), a field programmable gate array (FPGA), or the like.

Figure 4:
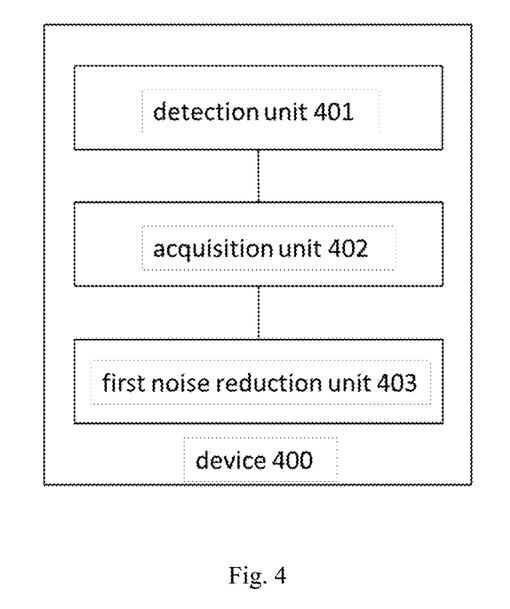
FIG. 4 is a schematic structural diagram of an image denoising device according to an embodiment of the present disclosure.

As shown in FIG. 4, an image denoising device 400 according to this embodiment includes:

a detection unit 401 configured to perform edge detection on a color image to obtain a preprocessed image;

an acquisition unit 402 configured to acquire a depth image having the same scene as the color image; and a first noise reduction unit 403 configured to perform a first noise reduction process on the preprocessed image according to the depth image to obtain a first image.

In an implementation, the detection unit includes:

a sharpening module configured to sharpen the color image to obtain a sharpened image; and a detection module configured to perform edge detection on the sharpened image to obtain the preprocessed image.

In an implementation, the first noise reduction unit is further configured to:

perform the first noise reduction process on the preprocessed image according to the connected region of each connected depth in the depth image to obtain the first image.

In an implementation, the first noise reduction unit includes:

a first determining module configured to determine high-frequency noises in the connected region according to the connected region of each connected depth in the depth image; and a noise reduction module configured to perform the first noise reduction process to remove the high-frequency noises to obtain the first image.

In an implementation, the device further includes:

an extraction unit configured to extract boundary pixels from the first image;

a first modification unit configured to modify initial parameter values of the boundary pixels in the first image to obtain a second image;

a second noise reduction unit configured to perform a second noise reduction process on the second image to obtain a third image;

a second modification unit configured to modify the parameter values of the boundary pixels in the third image to the initial parameter values to obtain a fourth image; and a third noise reduction unit configured to perform a third noise reduction process on the boundary pixels in the fourth image to obtain a fifth image, with a degree of noise reduction of the third noise reduction process being lower than that of the second noise reduction process.

In an implementation, the first modification unit includes:

a second determining module configured to determine a reference pixel for the boundary pixels;

a third determining module configured to determine a parameter value of the reference pixel; and a modification module configured to modify the initial parameter values of the boundary pixels in the first image to the parameter value of the reference pixel to obtain the second image.

In an implementation, the second determining module is further configured to determine a pixel which is within a preset distance range from the boundary pixels as the reference pixel; and the third determining module is further configured to, in response to that multiple reference pixels are determined, determine that an average of brightness values of the reference pixels is the parameter value of the reference pixels.

The above description of the embodiment of the device is similar to the above description of the embodiments of the method, and the embodiment of the device has the beneficial effects similar to those of the embodiments of the method. The technical details which are not disclosed in the embodiment of the device of the present disclosure can be understood with reference to the description of the embodiments of the method of the present disclosure.

It should be noted that, in the embodiments of the present disclosure, if the above image denoising method is implemented in the form a software functional module and sold or used as an independent product, the method may also be stored in a computer-readable storage medium. Based on such understanding, the essence of the technical solutions of the embodiments of the present disclosure or the contribution made by the technical solutions of the embodiments of the present disclosure to the related art may be implemented in the form of a software product, which is stored in a storage medium and includes several instructions to enable a computer device (which may be a personal computer, a video camera, a camera, a mobile terminal, a server, or a network device) to execute all or part of the method described in each embodiment of the present disclosure. The storage medium includes various media capable of storing program codes, such as a USB flash drive, a portable hard drive, a Read Only Memory (ROM), a magnetic disk, or an optical disc. Thus, the embodiments of the present disclosure are not limited to any specific combination of hardware and software.

Correspondingly, an embodiment of the present disclosure provides an image denoising apparatus including a memory and a processor. A computer program capable of running on the processor is stored on the memory, and the steps of the image denoising method provided by the above embodiments are performed when the processor executes the program.

Correspondingly, an embodiment of the present disclosure provides a computer-readable storage medium having a computer program stored thereon, and the steps of the image denoising method provided by the above embodiments are performed when the computer program is executed by a processor.

It should be noted that the above description of the embodiments of the storage medium and the apparatus is similar to the above description of the embodiments of the method, and the embodiments of the storage medium and the apparatus have the beneficial effects similar to those of the embodiments of the method. The technical details which are not disclosed in the embodiments of the storage medium and the apparatus of the present disclosure can be understood with reference to the description of the embodiments of the method of the present disclosure.

With the technical solutions provided by the embodiments of the present disclosure, details and most of edge information can be preserved when an image is denoised, and the blurring of the edges and the details can be avoided, with no need to acquire multiple frames of images, thereby improving the processing efficiency.

Figure 5:
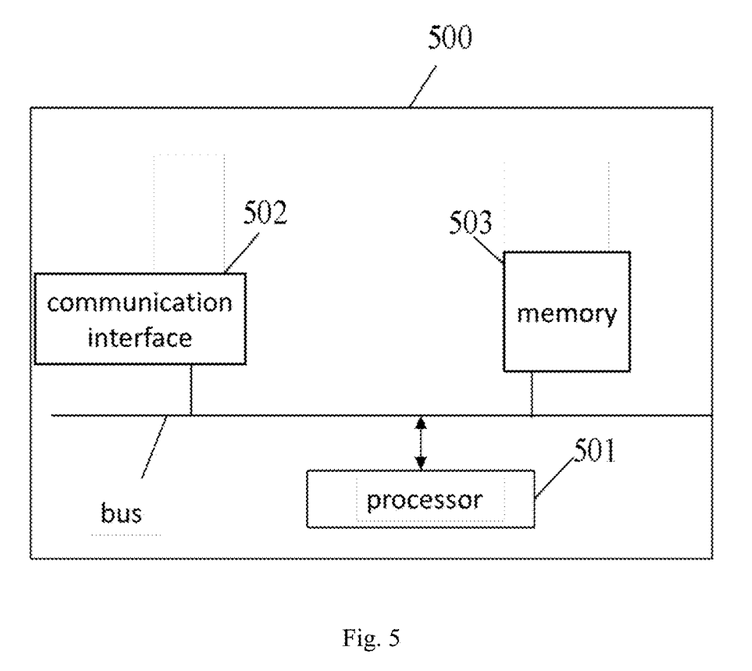
FIG. 5 is a schematic diagram of a hardware entity of an image denoising apparatus according to an embodiment of the present disclosure.

It should be noted that FIG. 5 is a schematic diagram of a hardware entity of an image denoising apparatus (such as a terminal device) according to an embodiment of the present disclosure. As shown in FIG. 5, a hardware entity of an image denoising apparatus 500 includes a processor 501, a communication interface 502 and a memory 503.

The processor 501 generally controls overall operation of the image denoising apparatus 500.

The communication interface 502 enables the image denoising apparatus to communicate with other terminals or a server via a network.

The memory 503 is configured to store instructions and applications capable of being executed by the processor 501, and can also cache data (such as image data, audio data, voice communication data, and video communication data) to be processed or already processed by the processor 501 and the modules in the image denoising apparatus 500. The memory 503 may be implemented by a flash memory (FLASH) or a Random Access Memory (RAM).

It should be understood that the term "an embodiment" or "the embodiment" in the whole description means that the particular features, structures or characteristics related to the embodiment are included in at least one embodiment of the present disclosure. Thus, the expression "in an embodiment" or "in the embodiment" in the whole description does not necessarily refer to the same embodiment. Furthermore, the particular features, structures or characteristics may be combined in one or more embodiments in any suitable way. It should be understood that the ordinal numbers of the above processes in the description of each embodiment of the present disclosure do not indicate an order of the execution of the processes, and the order of the execution of the processes should be determined based on the functions and the internal logic of the processes, and the ordinal numbers of the processes do not limit the implementation of the embodiments of the present disclosure in any way. The ordinal numbers of the above embodiments of the present disclosure are merely for description, and do not indicate a preferential order of the embodiments.

It should be noted that, in the present disclosure, the terms "includes", "comprises" or any other variation thereof are intended to indicate a non-exclusive inclusion, so that a process, method, article, or device, which includes a series of elements, does not only include those listed elements but also include other elements which are not explicitly listed, or the elements inherent in such process, method, article, or device. If there are no more limitations, limiting an element by "including a . . . " does not exclude the existence of other identical elements in the process, method, article, or device which includes the element.

It should be understood that the apparatus and the method disclosed in the above embodiments of the present disclosure may be implemented in other manners. The embodiment of the apparatus described above is merely illustrative, for example, the division of the units is just the division of logical function, and the units may be divided otherwise in practical applications, for example, a plurality of units or components may be combined, or be integrated into another system, or some features may be omitted, or may be not implemented. In addition, the coupling, direct coupling or communication connection between the components shown or discussed may be implemented through some interfaces, and the indirect coupling or communication connection between the devices or units may be electrical or mechanical, or in other forms.

The above units described as separate parts may be physically separate, or may not. The parts shown as units may be physical units, or may be not physical units. The units may be located in one place or distributed in a plurality of network units. Some or all of the units may be selected according to actual needs to achieve the objective of the technical solutions of the embodiments.

In addition, all of the functional units in each embodiment of the present disclosure may be integrated into one processing unit, or each unit may be implemented as an independent unit, or two or more units may be integrated into one unit. The integrated unit may be implemented in the form of hardware, or in the form of hardware plus a software functional unit.

It should be understood by those of ordinary skill in the art that all or part of the steps in the above embodiments of the method may be implemented by instructing related hardware with a program, which may be stored in a computer-readable storage medium, and the steps in the above embodiments of the method are performed when the program is executed; and the storage medium includes various media capable of storing program codes, such as a portable storage device, an ROM, a magnetic disk, or an optical disc.

Alternatively, if implemented in the form a software functional module and sold or used as an independent product, the above integrated unit of the present disclosure may also be stored in a computer-readable storage medium. Based on such understanding, the essence of the technical solutions of the embodiments of the present disclosure or the contribution made by the technical solutions of the embodiments of the present disclosure to the related art may be implemented in the form of a software product, which is stored in a storage medium and includes several instructions to enable a terminal device (which may be a personal computer, a mobile phone, a camera, a video camera, etc.) to execute all or part of the method described in each embodiment of the present disclosure. The storage medium includes various media capable of storing program codes, such as a portable storage device, an ROM, a magnetic disk, or an optical disc.

The above description is of the embodiments of the present disclosure, but the protection scope of the present disclosure is not limited thereto. Those ordinary skills in the art can easily think of changes or substitutions within the technical scope disclosed by the present disclosure, and the changes or substitutions should be considered to fall within the protection scope of the present disclosure. Therefore, the

What is claimed is:

1. An image denoising method, comprising:
performing edge detection on a color image to obtain a preprocessed image;
acquiring a depth image having the same scene as the color image;
performing a first noise reduction process on the preprocessed image according to the depth image to obtain a first image;
extracting boundary pixels from the first image;
modifying initial parameter values of the boundary pixels in the first image to obtain a second image;
performing a second noise reduction process on the second image to obtain a third image;
modifying parameter values of the boundary pixels in the third image to the initial parameter values to obtain a fourth image; and
performing a third noise reduction process on the boundary pixels in the fourth image to obtain a fifth image;
wherein a degree of noise reduction of the third noise reduction process is lower than that of the second noise reduction process.

2. The method of claim 1, wherein the performing edge detection on the color image to obtain the preprocessed image comprises:
sharpening the color image to obtain a sharpened image; and
performing edge detection on the sharpened image to obtain the preprocessed image.

3. The method of claim 2, wherein the performing the first noise reduction process on the preprocessed image according to the depth image to obtain the first image comprises:
performing the first noise reduction process on the preprocessed image according to a connected region of each connected depth in the depth image to obtain the first image.

4. The method of claim 3, wherein the performing the first noise reduction process on the preprocessed image according to the connected region of each connected depth in the depth image to obtain the first image comprises:
determining high-frequency noises in the connected region according to the connected region of each connected depth in the depth image; and
performing the first noise reduction process to remove the high-frequency noises to obtain the first image.

5. The method of claim 1, wherein the modifying initial parameter values of the boundary pixels in the first image to obtain the second image comprises:
determining a reference pixel for the boundary pixels;
determining a parameter value of the reference pixel; and
modifying the initial parameter values of the boundary pixels in the first image to the parameter value of the reference pixel to obtain the second image.

6. The method of claim 5, wherein the determining the reference pixel for the boundary pixels comprises determining a pixel which is within a preset distance range from the boundary pixels as the reference pixel; and
the determining the parameter value of the reference pixel comprises: in response to that multiple reference pixels are determined, determining that an average of brightness values of the reference pixels is the parameter value of the reference pixels.

7. An image denoising apparatus, comprising a memory and a processor, wherein a computer program capable of running on the processor is stored on the memory, and the image denoising method of claim 1 is implemented when the processor executes the computer program.

8. A non-transitory computer-readable storage medium having computer-executable instructions stored thereon, wherein the computer-executable instructions are configured to perform the image denoising method of claim 1 when the computer-executable instructions are executed by a processor.

9. An image denoising device, comprising a processor configured to:
perform edge detection on a color image to obtain a preprocessed image;
acquire a depth image having the same scene as the color image;
perform a first noise reduction process on the preprocessed image according to the depth image to obtain a first image;
extract boundary pixels from the first image;
modify initial parameter values of the boundary pixels in the first image to obtain a second image;
perform a second noise reduction process on the second image to obtain a third image;
modify parameter values of the boundary pixels in the third image to the initial parameter values to obtain a fourth image; and
perform a third noise reduction process on the boundary pixels in the fourth image to obtain a fifth image;
wherein a degree of noise reduction of the third noise reduction process is lower than that of the second noise reduction process.

* * * * *